Figure 1:
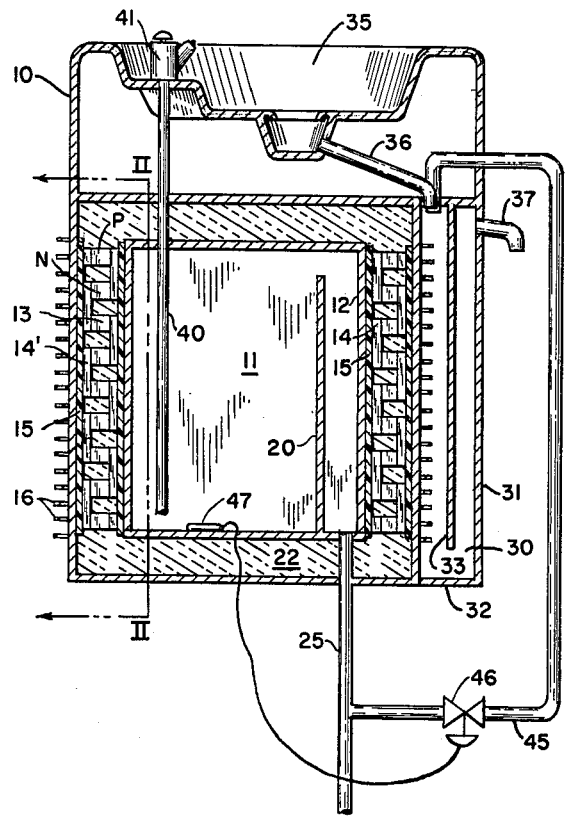

Nov. 14, 1961   A. C. SHECKLER   3,008,299
THERMOELECTRIC WATER COOLER
Filed April 9, 1959

INVENTOR.
ADDISON C. SHECKLER
BY Herman Seid
ATTORNEY

United States Patent Office 3,008,299
Patented Nov. 14, 1961

1

3,008,299
THERMOELECTRIC WATER COOLER
Addison C. Sheckler, Cato, N.Y., assignor to Carrier Corporation, Syracuse, N.Y., a corporation of Delaware
Filed Apr. 9, 1959, Ser. No. 805,217
10 Claims. (Cl. 62—3)

This invention relates to water fountains of the bubbler type and, more particularly, to a water fountain including a thermoelectric refrigeration system permitting the utilization of same for the cooling of drinking water.

With the increase and growth of commercial and industrial establishments, the need has arisen for providing cool water for drinking purposes. This is generally accomplished by the use of so-called water coolers or fountains which serve to chill the available tap water to enhance its potability to fulfill the drinking requirements of the employees and patrons of these establishments. The conventional water cooler employs a compression refrigeration system, the cooling coils of which are arranged in heat exchange relationship with a water supply source. These conventional water coolers require frequent maintenance of the refrigeration system components; are relatively cumbersome in size, occupying valuable floor space; and are a source of noise resulting from the operation of the compressor motor.

The substitution of a thermoelectric refrigeration system in lieu of the aforementioned compression refrigeration system would serve to substantially eliminate some of the aforementioned problems, in that maintenance requirements, and noise resulting from relatively moving mechanical components are no longer present. However, the cooling requirements of a water cooler have in the past been unattainable in a commercially feasible fashion, by the use of thermoelectric refrigeration techniques. The size of the components, and the costs of electricity required for effecting desired temperature changes in the water have been such as to preclude the development of an economical apparatus.

It is with the above problems in mind that the present means have been evolved, means permitting the utilization of a thermoelectric refrigeration system to cool drinking water to potable temperatures, said means efficiently utilizing all of the heat pumping effects of the thermoelectric refrigeration system, whereby the size of the refrigeration system components, and the current requirements permit the development of a water cooler having no relatively moving parts, quiet in operation, and occupying a minimal volume permitting installation as a wall hung unit, desk unit or the like.

It is accordingly a primary object of this invention to provide novel means for placing water in heat exchange relationship with the heat transfer elements of a refrigeration system to permit effective and efficient cooling of the water.

It is also an important object of this invention to provide an improved water cooler for the cooling of available tap water to a desired potable temperature.

Another object of the invention is to provide a water cooler requiring minimal maintenance.

A further object of the invention is to provide a water cooler having no moving parts thus eliminating noise and wear.

It is also an object of this invention to provide a compact water cooler which may be installed without requiring a waste of valuable commercial or industrial floor space.

An additional object of the invention is to provide novel water cooling means of an extremely efficient nature, whereby thermoelectric refrigeration systems may be employed for cooling purposes.

It is also an object of the invention to provide a novel method for directing water through a water cooler to increase the effectiveness of any refrigeration system employed in the cooling of said water.

Another object of the invention is to make use of the waste water of a water cooler.

These and other objects of the invention which will become apparent in the following disclosure and claims are achieved by provision of a thermally insulated water receiving holding tank connected by appropriate supply lines to a source of potable water such as tap water. An outlet is provided on the tank for selectively discharging water therefrom. At least one of the side walls of said tank is provided with a battery of thermoelectric couples, the cold junctions of which are arranged in heat exchange relationship with the interior of the compartment, and the hot junctions of which are arranged in a heat exchange relationship with the exterior of the tank. A waste water conduit is arranged in heat exchange relationship with the hot junctions, and the flow path of the waste water is arranged in counterflow to the flow path of the inlet water provided to the tank through the supply line. These flow paths are directed on the opposite sides of at least one of the walls provided with the thermoelectric couples. A thermostatically controlled valve permits the passage of water from the supply line over the flow path described for the waste water in the event that waste water is not available.

An important feature of the invention resides in the novel paths for the inlet water and cooling water which are directed in a counterflow direction to each other to attain a minimal temperature gradient across the thermoelectric couples, thus increasing the refrigeration efficiency of these thermoelectric couples, and permitting attainment of a commercially feasible structure employing a thermoelectric refrigeration system for cooling purposes.

Another feature of the invention resides in the novel arrangement of the thermostatic valve to permit inlet water to flow over the hot junctions of the thermoelectric couples to attain the aforementioned efficiency, in the event that waste water is not available for dissipating heat from the hot junction.

An additional feature of the invention resides in the arrangement of thermoelectric refrigeration components whereby the benefits of water cooling and air cooling may be employed.

Figure 2:
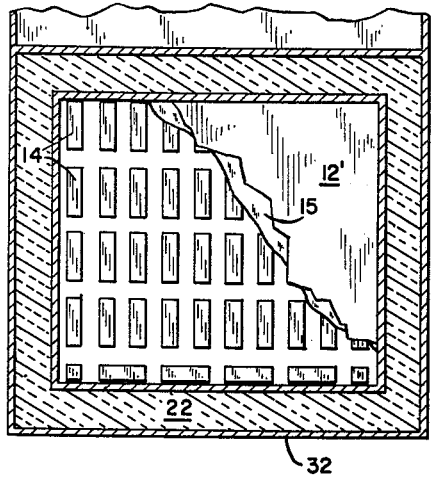

The specific structural details of the invention, and their mode of functioning will be made most manifest and particularly pointed out in full, clear, concise, and exact terms in conjunction with the accompanying drawings wherein:

FIGURE 1 is a schematic cross sectional view through a water cooler constructed in accordance with the principles of this invention; and FIGURE 2 is a cross sectional elevational view taken on line II—II of FIGURE 1.

Referring now more particularly to the drawings, like numerals in the various figures will be taken to designate like parts.

In the embodiment of the invention illustrated in the drawings, the water cooler 10 is illustrated as comprising a rectangularly shaped box having an interior compartment forming a water receiving reservoir or holding tank 11. Opposite side walls 12, 12' are shown formed with a battery of thermoelectric couples 13, each couple comprising two dissimilar thermoelectric arms labelled P and N. In accordance with conventional practice, the arm P is made up of p-type thermoelectric material having a positive thermoelectric power, and the arm N is made up of an n-type material having negative thermoelectric power. Opposite ends of the arms N and P are joined by a junction 14 and the remote arm of the battery is connected to an appropriate source of direct current to effect current flow causing junction 14 to act as heat absorbing cold junctions, and junctions 14' to act as heat dissipating hot junctions. A thermally conducting electrical insulating layer 15 is provided between the surface of wall 12 and the thermoelectric arms and their junctions 14 and 14' respectively. A suitable wall structure in which the thermoelectric couples are electrically insulated from the outside surface of the wall, but are in heat exchange relationship therewith, is more fully described in my co-pending application S.N. 805,216, filed April 9, 1959.

If desired fins 16 may be extended from the surface of walls 12 and 12' on either side thereof to extend the effective heat transfer area of the junctions 14.

On the interior surface of wall 12, directed into tank 11, an inlet water baffle plate 20, vertically extending parallel to wall 12 almost up to the top surface of tank 11 is provided. In the lower wall 22 of tank 11, between inlet water baffle plate 20 and wall 12 a water inlet supply line 25 is provided connected to an appropriate water source. On the outside of wall 12 (to the right as viewed in FIGURE 1), a refrigeration system cooling water compartment 30 is arranged. Cooling compartment 30 shaped to provide a water trap comprises an outer wall 31 extending parallel to wall 12 and a bottom wall 32 extending from the bottom of wall 12. Within compartment 30 a directing guide plate 33 extends downwardly parallel to wall 31 and stopping before bottom wall 32. The upper part of guide plate 33 is connected to the lower part of waste water collecting drain trough 35, which has a drain spout 36 leading waste water from trough 35 into compartment 30 on the side of guide plate 33 adjacent the outside surface of wall 12 which functions as waste water directing means and is in heat exchange relationship with the hot junctions 14' of the thermoelectric couples 13. At the upper part of wall 31 on the side of guide plate 33 opposite wall 12 a discharge connection 37 is provided for connection to an appropriate sewer or other waste.

Leading from the tank 11 to trough 35 via an appropriate valved spigot or bubbler 41 for discharge of drinking water, is discharge conduit 40.

Inlet water from the supply source may be directed to trap like cooling compartment 30 by means of auxiliary cooling line 45. The passage of water through line 45 is controlled by thermostatically actuated valve 46 coupled to thermostat 47 here shown as arranged within reservoir or holding tank 11, but suitable for arrangement in a variety of other positions to sense a temperature condition at the hot junctions of the thermoelectric couples which would warrant the provision of auxiliary cooling water to dissipate the heat of said junctions. Thus the thermostat 47 may be positioned in compartment 30.

The aforedescribed, schematically illustrated water cooler, due to an increased efficiency produced by the water flow paths provided may be formed of relatively small light weight nature thus permitting the structure to be either wall mounted or desk mounted as desired.

In the described embodiment of the invention, only walls 12, 12' of the tank 11 were described as containing a battery of thermoelectric couples, however, it will be obvious to those skilled in the art that depending on desired cooling effects, as much of the wall area of the tank as desired may be formed with thermoelectric couples. The wall 12 has been described as having its hot junctions arranged in heat exchange relationship with a refrigeration system cooling water compartment 30, while as seen in the drawing wall 12' has its hot junctions air cooled.

It will be apparent to those skilled in the art that though it is desirable to have as many water cooled hot junctions as possible, desired efficiency may be obtained by having only some of the hot junctions of the thermoelectric couples employed arranged in heat exchange relationship with a water flow path, since the temperature of the surrounding air may in given installations provide sufficient heat dissipation.

In use, the novel water cooler is coupled to an appropriate water supply source and source of electrical energy for the refrigeration system, which in the case of the illustrated thermoelectric system must be a D.C. source. The water supply is here contemplated as having a sufficient head pressure to provide for desired flow to the bubbler 41. Thus in most industrial and commerical installations, the relatively high water supply tank will provide the necessary head pressures. Water is admitted to reservoir or water receiving holding tank 11 through supply line 25. In passing into holding tank 11, the water passes upwardly over the interior surface of wall 12 which results in it being placed in heat exchange relationship with the cold junctions 14 of the thermoelectric couples 13 therein. After passage in relatively close proximity to the surface of wall 12 the inlet water flows over the top edge of baffle plate 20 for storage in reservoir or tank 11.

In general use, only a portion of the water discharged through discharge conduit 40 is consumed. The chilled water which would normally be wasted may here be employed for dissipating the heat at the hot junction of the refrigeration system thermoelectric couples. This is accomplished by directing the waste water through drain 36 downwardly over the outside surface of wall 12 in heat exchange relationship with the hot junctions 14 of the thermoelectric couples 13. At the bottom of compartment 30 this drain water is upwardly directed on the opposite side of guide plate 33 to discharge connection 37 leading to a suitable waste, which may be either a sewer connection or waste sump. It will thus be observed that the chilled waste water is maintained in heat exchange relationship with the hot junctions of the thermoelectric couples by the trap formation of compartment 30.

In the event that the quantities of waste water are insufficient to provide adequate heat dissipation from the hot junctions as might occur where all of the water discharged is caught in a container, or where the water cooler has not been used for a period of time, then the efficiency attained by lowering of the temperature surrounding the hot junction to produce a minimal temperature differential between the hot and cold junction is no longer adequate to permit utilization of a thermoelectric refrigeration system.

In the illustrated embodiment of the invention, the hot junctions of the thermoelectric couples in wall 12' are air cooled. This may be adequate to attain desired temperature gradients across wall 12' to sufficiently cool the water in tank 11 when the cooler is not in use.

If the air cooling is not sufficient or if no air cooled wall is employed, water cooling of the hot junctions may be provided through auxiliary cooling or supply line 45. Thus, as illustrated the loss of efficiency will be indicated by a temperature rise in the water in reservoir or tank 11. This will cause thermostat 47 to open valve 46 permitting supply water to pass through line 45 to compartment 30.

It will be apparent that the counterflow paths provided for the inlet water and the waste water over opposite sides of thermoelectric couples 13 serves to produce a minimal temperature differential between the hot and cold junctions of these thermoelectric couples. This is apparent when it is considered that the warmest inlet water, namely that first entering holding tank 11, passes over a thermoelectric couple which is in heat exchange relationship with the warmest drain water, namely that which has already flowed over a major portion of the surface of wall 12. As the inlet water is cooled in its flow over the interior surface of wall 12 it is in heat exchange relationship with a thermoelectric couple the opposite junction of which is in heat exchange relationship with the coolest waste water, namely that which has first been admitted to the drain flue 30, so that a minimum temperature gradient across the thermoelectric couples exists.

Clearly, the aforedescribed improvements in thermo configuration can be applied to a water cooler employing a compression refrigeration system with a resultant increase in efficiency. However, the water flow paths required for adequate condenser cooling result in a rather elaborate and complex system in which the operating efficiencies are mitigated by increased production costs.

It is thus seen that a novel water cooler has been provided in which improved flow paths for the inlet and drain water permit the utilization of a thermoelectric refrigeration system for cooling purposes. This permits the water cooler to be made of a relatively small compact nature having no moving parts, not adding heat or noise to the environment.

The above disclosure has been given by way of illustration and elucidation, and not by way of limitation, and it is desired to protect all embodiments of the herein disclosed inventive concept within the scope of the appended claims.

I claim:

1. In a water fountain of the bubbler type, the combination of a housing; a reservoir for cooled water in said housing; means coupled to said housing supplying water to said reservoir; bubbler means leading from said reservoir permitting selective discharge of cooled water therefrom; waste collecting means adjacent said bubbler means for collecting water discharged by said bubbler means and not consumed; waste water directing means leading the waste water from said collecting means; means in heat exchange relationship with the supplied water, said means including a thermoelectric battery having cold junctions in heat exchange relationship with the supplied water and having hot junctions in heat exchange relationship with the water directed by said directing means, and a thermoelectric battery having cold junctions in heat exchange relationship with the supplied water and hot junctions in heat exchange relationship with the air; and connecting means between said means for supplying water and said waste water directing means whereby supply water may be employed to effect dissipation of heat.

2. A water fountain as in claim 1 in which a thermostatically actuated valve means are arranged in combination with said connecting means and said reservoir to permit the flow of water through said connecting means only upon the occurrence of a given temperature in said reservoir.

3. In appartus for cooling drinking water to a desired temperature to enhance its potability, said apparatus including a refrigeration system having a heat absorbing element and a heat dissipating element; a water receiving holding tank having an inlet; a supply line coupled to the inlet of said tank and feeding water thereto from a supply source, the water fed by said supply line being directed over a heat absorbing element of the refrigeration system in heat exchange relationship therewith; a discharge conduit coupled to said tank to permit discharge of water therefrom for consumption; a refrigeration system cooling water compartment on said tank through which water is directed in heat exchange relationship with the heat dissipating element of the refrigeration system; an auxiliary cooling water line extending between said supply line and said compartment; a thermostatically controlled valve arranged to control the passage of water through said cooling water line, said valve being opened in response to an undesired rise in temperature of the water in said tank to permit the passage of supply water to said compartment, whereby the temperature differential between which the refrigeration system must effect heat pumping is reduced thus improving the efficiency of the system.

4. In a water fountain of the bubbler type, the combination of a housing; a reservoir for cooled water in said housing; means coupled to said housing supplying water to said reservoir; bubbler means leading from said reservoir permitting selective discharge of cooled water therefrom; waste collecting means adjacent said bubbler means for collecting water discharged by said bubbler means and not consumed; thermoelectric means having a heat absorbing junction in heat exchange relationship with the supplied water; waste water directing means leading the waste water from said waste water collecting means into heat exchange relationship with a heat dissipating junction of said thermoelectric means to aid in dissipating heat therefrom; connecting means between said means for supplying water and said waste water directing means, whereby supply water may be employed to effect dissipation of heat from said thermoelectric means; and a thermostatically actuated valve means arranged in combination with said connecting means and said reservoir to permit the flow of water through said connecting means only upon the occurrence of a given temperature differential in said reservoir.

5. In an apparatus for effecting a change in the temperature of water, a tank adapted to contain water, inlet means associated with said tank adapted to admit water into said tank, outlet means associated with said tank adapted to discharge water from said tank, a thermoelectric heat exchanger comprising a pair of surfaces adapted to have differing temperatures upon the passage of an electric current through said thermoelectric heat exchanger, one of said surfaces being located to effect heat exchange with water in said tank, the other of said surfaces being located to effect heat exchange with a fluid exterior of said tank, means to collect unconsumed water discharged from said tank, means to pass said unconsumed water in heat exchange relation with said other surface to conserve the energy resulting in a change in thermal energy thereof and means to pass additional water from a supply source thereof into heat exchange relation with said other surface to effect additional heat exchange therewith.

6. An apparatus as defined in claim 5 including automatic means responsive to the temperature of water in said tank to control the flow of said additional water into heat exchange relation with said other surface.

7. In a water fountain of the bubbler type, the combination of a reservoir for cooled water, means to supply water to said reservoir, bubbler means leading from said reservoir permitting selective discharge of cooled water therefrom, means to collect unconsumed waste water discharged from said bubbler, thermoelectric heat exchange means comprising a heat absorbing junction and a heat dissipating junction spaced therefrom, said heat absorbing junction being located in heat exchange relation with water supplied to said tank, said heat dissipating junction being located in heat exchange relation with the unconsumed collected water, means to pass additional cooling fluid in heat exchange relation with said heat dissipating junctions, and means to regulate the passage of said additional cooling fluid in heat exchange relation with said heat dissipating junctions.

8. A water cooler comprising a water holding tank having walls; a thermoelectric couple having a hot junction and a cold junction arranged in one of the walls of said tank with the hot junction of the thermocouple in heat exchange relationship with an exterior surface of said one wall and the cold junction in heat exchange relationship with an interior surface of said one wall; a cooling water compartment arranged along the exterior surface of said one wall through which water may flow in heat exchange relationship with the hot junction; a water supply line coupled to said tank to feed water into said tank in heat exchange relationship with the cold junction of said couple; a discharge line permitting the delivery of water from said tank for consumption; a drain trough in which any unconsumed water is drained to said compartment, whereby the waste water generally present in water cooler use may be employed to dissipate heat from the hot junction of the couple to lower the temperature gradient thereacross and increase its efficiency; and a thermoelectric couple arranged in another of said walls with the hot junction of said couple being air cooled.

9. A water cooler comprising a water holding tank having walls; a thermoelectric couple having a hot junction and a cold junction arranged in one of the walls of said tank with the hot junction of the thermocouple in heat exchange relationship with an exterior surface of said one wall and the cold junction in heat exchange relationship with an interior surface of said one wall; a cooling water compartment arranged along the exterior surface of said one wall through which water may flow in heat exchange relationship with the hot junction; a water supply line coupled to said tank to feed water into said tank in heat exchange relationship with the cold junction of said couple; a discharge line permitting the delivery of water from said tank for consumption; a drain trough in which any unconsumed water is drained to said compartment, whereby the waste water generally present in water cooler use may be employed to dissipate heat from the hot junction of the couple to lower the temperature gradient thereacross and increase its efficiency; means to direct the flow of said unconsumed water drained to said compartment across the exterior surface of the said one wall of said tank; and means to direct said water from said supply line to flow across the said interior surface of said one wall of said tank in counterflow relation with respect to the flow of said unconsumed water drained to said compartment, whereby the hottest cooling water is opposite the hottest inlet water, thus providing for a minimal temperature gradient and maximum efficiency of operation of the couple.

10. In a water fountain of the bubbler type, the combination of a housing; a reservoir for cooled water in said housing; means coupled to said housing supplying water to said reservoir; bubbler means leading from said reservoir permitting selective discharge of cooled water therefrom; waste collecting means adjacent said bubbler means for collecting water discharged by said bubbler means and not consumed; a thermoelectric battery comprising a thermoelectric junction adapted to be cooled and a thermoelectric junction adapted to be heated upon the passage of an electric current therethrough in a predetermined direction, said junction adapted to be cooled forming a heat absorbing junction located in heat exchange relationship with the supplied water; waste water directing means leading the waste water from said waste water collecting means into heat exchange relationship with said junction adapted to be heated forming a heat dissipating junction, to remove heat from said heat dissipating junction thereby improving the effectiveness of said thermoelectric battery in removing heat from said supplied water; and said thermoelectric battery including at least one additional junction of the type adapted to be heated upon the passage therethrough of an electric current in said predetermined direction, said last named junction being located in heat exchange relation with ambient air to utilize said ambient air for absorption and transfer of heat from the water supplied to said reservoir.

References Cited in the file of this patent

UNITED STATES PATENTS

| | | |
|---|---|---|
| 2,010,504 | Askin | Aug. 6, 1935 |
| 2,870,610 | Lindenblad | Jan. 27, 1959 |